United States Patent

Yamano et al.

[11] Patent Number: 5,479,701
[45] Date of Patent: Jan. 2, 1996

[54] COVER STRIP-OFF METHOD IN A COVERED WIRE CUTTING AND STRIPPING APPARATUS

[75] Inventors: Yoshiaki Yamano; Masayoshi Hashimoto, both of Yokkaichi; Hiroji Kodera, Gifu, all of Japan

[73] Assignee: Sumitomo Wiring Systems, Ltd., Mie, Japan

[21] Appl. No.: 246,629

[22] Filed: May 20, 1994

[30] Foreign Application Priority Data

May 25, 1993 [JP] Japan ................................. 5-122891

[51] Int. Cl.⁶ .................................................. H02G 1/12
[52] U.S. Cl. ......................... 29/825; 29/426.4; 29/564.4; 81/9.51
[58] Field of Search ................................ 29/426.4, 564.4, 29/825, 755; 81/9.4, 9.51; 30/90.1

[56] References Cited

U.S. PATENT DOCUMENTS

| | | | |
|---|---|---|---|
| 4,185,522 | 1/1980 | Reinertz et al. | 81/9.51 |
| 4,345,362 | 8/1982 | de Givry | 29/426.5 |
| 4,802,512 | 2/1989 | Kodera | 81/9.51 |
| 4,869,135 | 9/1989 | Hoffa | 81/9.51 |
| 5,142,950 | 9/1992 | Takano et al. | |
| 5,226,224 | 7/1993 | Ishizuka et al. | 29/564.4 |
| 5,337,633 | 8/1994 | Carpenter et al. | 81/9.51 |

FOREIGN PATENT DOCUMENTS

| | | | |
|---|---|---|---|
| 61-273114 | 12/1986 | Japan . | |
| 2187338 | 8/1987 | United Kingdom | 81/9.51 |

*Primary Examiner*—S. Thomas Hughes
*Attorney, Agent, or Firm*—Oliff & Berridge

[57] ABSTRACT

A cover at an end portion of a covered wire is incised by upper and lower cutting blades. The covered wire and the cutting blades are moved relatively in the longitudinal direction of the covered wire to thereby start the cover stripping operation at an end portion of the cover on the core. Thereafter, during this relative movement, the depth of incising the cover by the cutting blades is reduced step by step within a range where blade portions of the cutting blades can catch the cover. Even in the case where the cover of a covered wire is thin, it is made possible not only to strip the cover surely, but also to prevent a core from being injured.

11 Claims, 6 Drawing Sheets

COVER STRIP-OFF METHOD IN A COVERED WIRE CUTTING AND STRIPPING APPARATUS

BACKGROUND OF THE INVENTION

The present invention relates to a cover strip-off method in an apparatus for cutting and stripping covered wires such as covered electric wires, optical fiber cables, and the like, used in various electric machineries and apparatuses.

Generally, a covered electric wire 31 cut to a predetermined size as shown in FIG. 14 is used in an electronic/electric machine or apparatus. This covered electric wire 31 has a cover 33 on the surface of a core 32 of copper or the like. The cover 33 is made of polyvinyl chloride resin mainly for insulation. The length L1 of the covered electric wire 31, the length L2 of the cover 33, and the exposed lengths of the core 32, that is, the stripped-off lengths L3 and L4 of the cover 33, are configured to predetermined sizes in accordance with the portion where the wire is used.

As an apparatus for automatically configuring such a covered electric wire, the applicant of the present application has proposed an automatic electric wire cutting and stripping apparatus shown in Japanese Patent Unexamined Publication No. Sho-61-273114. The covered electric wire cutting and stripping method in this cutting and stripping apparatus includes steps in which a pair of upper and lower cutting blades facing each other are moved from a standby position where their blade portions do not reach the cover of the covered electric wire to a cutting position where the cutting blades cut the covered electric wire. The cutting blades are moved back to the standby position from the cutting position, and the covered electric wire is moved in its longitudinal direction in the state where the cutting blades have been moved to the standby position. This covered electric wire cutting and stripping method further has a step in which the above-mentioned cutting blades are moved from the standby position to an incision position so as to form an incision in the cover of the covered electric wire, and thereafter, the cutting blades are moved to a non-interference position retracted from the incision position or from a core of the covered electric wire within a range where the blade portions of the cutting blades can catch the cover. The core of the covered electric wire and the cover at the end portion of the covered electric wire are moved relative to each other from the state where the cutting blades have been moved to the non-interference position so as to strip the cover on the core by the cutting blades, and thereafter, the cutting blades are moved back to the standby position from the non-interference position.

In the above-mentioned conventional cover incising and stripping method, the cover is incised by the cutting blades, and the cutting blades are moved within a range where their blade portions can catch the cover. Thereafter, the covered wire is relatively moved in the stripping direction. Accordingly, the blade portions of the cutting blades are prevented from scratching the core at the time of the operation of stripping the cover, and the core is prevented from being injured or broken. In the case where the cover is thin, however, when the cutting blades are moved from the incision position where the cutting blades contact the core, the cutting blades can catch the end surface of the cover such that the cutting blades are detached from the incision end surface of the cover by the cover stripping resistance at the initial time, thereby making it impossible to perform the cover stripping operation. In addition, even in the case where the cover is thick, if the length of the stripping of the cover is so large that the cover stripping resistance is large at the time of starting the cover stripping operation, the cutting blades are retracted by the large cover stripping resistance from the incision position where the cutting blades contact the core so that the cutting blades are detached from the cover, thereby making it impossible for the cutting blades to perform the cover stripping operation.

SUMMARY OF THE INVENTION

It is an object of the present invention to provide a cover stripping method in an apparatus for cutting a covered wire and stripping its cover, by which the cover of the covered wire can be properly stripped.

In order to attain the foregoing object, according to the present invention, a cut is made in the cover at the end portion of the covered wire by a plurality of cutting blades to an extent that the cut reaches or approaches a core of the covered wire. The covered wire and the cutting blades are moved relative to each other in the longitudinal direction of the covered wire, and the quantity of incision in the covered wire by the cutting blades is reduced within a range where blade portions of the cutting blades can catch the cover.

According to the present invention, the cover of a covered wire is incised, and the incision by the cutting blades is reduced while the covered wire and the cutting blades are moved relative to each other. Accordingly, the initial cover stripping operation can be properly performed, and the incision depth of the cover by the cutting blades is reduced during the cover stripping operation when the resistance in the cover stripping is smaller. It is therefore possible to prevent a core from being injured. Although the core is injured by the cutting blades partially at the time of starting the cover stripping operation if the cutting blades contact the core, the degree of such injury is minimal. That is, in the case where the core is stranded wire, the cutting blades are separated from the core before the stranded wire is cut by the cutting blades. In the case where the core is composed of a single wire, the surface of the core is injured partially at the time of starting the cover stripping operation, but such injury is very slight in comparison with the case where the core is scratched by the cutting blades throughout the stripping process.

BRIEF DESCRIPTION OF THE DRAWINGS

These and other aspects and advantages of the present invention will become apparent from the following detailed description of preferred embodiments when taken in conjunction with the accompanying drawings, in which.

DETAILED DESCRIPTION OF PREFERRED EMBODIMENTS

An embodiment in which the present invention is carried out as a cover stripping method in an automatic cutting and stripping apparatus for a covered wire will be described with reference to FIGS. 1 to 12.

Figure 2:
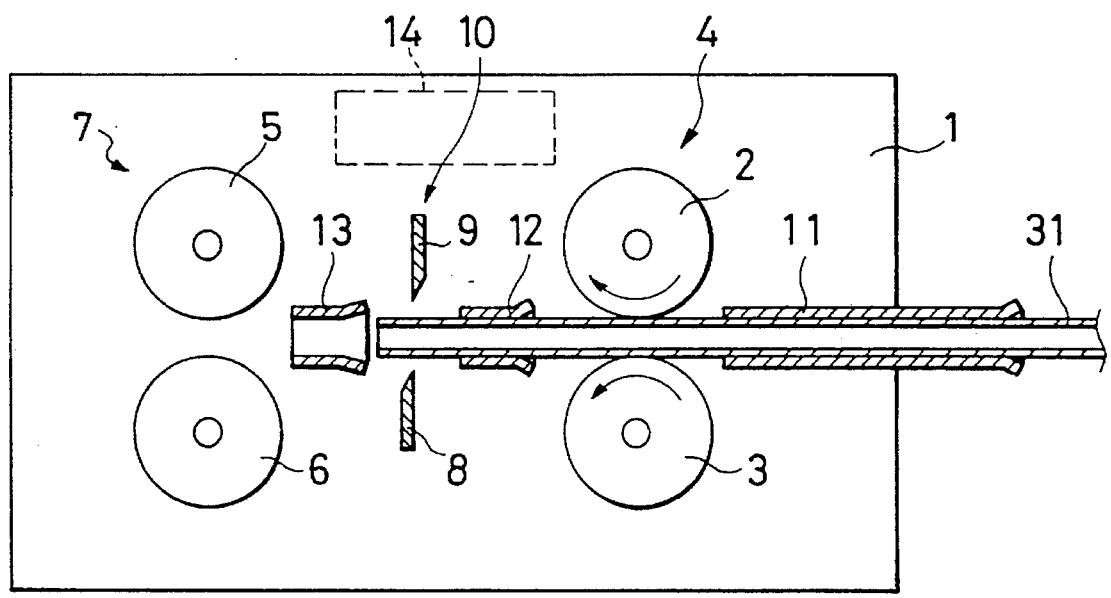
FIG. 2 is a partial sectional front view of a cutting and stripping apparatus for a covered wire.

As shown in FIG. 2, the wire cutting and stripping apparatus in this embodiment has a feed-out/draw-back mechanism 4 provided on the front side of a casing 1 and having a pair of rollers 2 and 3 for feeding out or drawing back a covered wire 31 by forward or reverse rotation. A second draw-out/feed-back mechanism 7 having a pair of rollers 5 and 6 is also provided for drawing out or feeding back the covered wire 31 by forward or reverse rotation similar to the mechanism 4. In addition, the wire cutting and stripping apparatus has a cutting and incising mechanism 10 provided between the above-mentioned mechanisms 4 and 7 and having a fixed cutting blade 8 and a movable cutting blade 9 for performing both the cutting of the covered wire 31 and the incising of a cover 33. The cutting and incising mechanism 10 will be described later.

A guide pipe 11 for guiding the covered wire 31 to a space between the rollers 2 and 3, a guide pipe 12 for guiding the covered wire 31 transferred from the rollers 2 and 3 to the cutting and incising mechanism 10, and a guide pipe 13 for guiding the covered wire 31 to a space between the rollers 5 and 6 are supported horizontally on the front side of the casing 1.

In the casing 1, there is also provided an operation control mechanism 14 for outputting various operation signals to the feed-out/draw-back mechanism 4, the draw-out/feed-back mechanism 7, the cutting and incising mechanism 10, etc., on the basis of a predetermined program, or on the basis of setting signals that are newly set.

The operation control mechanism 14 will be described with reference to FIG. 3. The control mechanism 14 has a control circuit 18 constituted by a central processing unit (CPU) 15 for performing various processing operations, a read only memory (ROM) 16, and a random access memory (RAM) 17. A first pulse motor M1 for performing forward/reverse rotation of the rollers 2 and 3 and a second pulse motor M2 for performing forward/reverse rotation of the rollers 5 and 6 are connected to the control circuit 18. A third pulse motor M3 for driving the movable cutting blade 9 is also connected to the control circuit 18.

Figure 4:
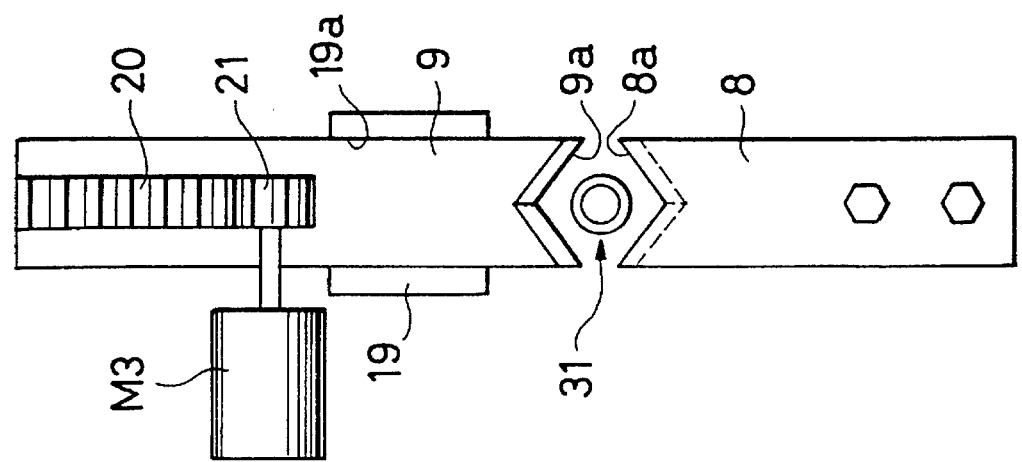
FIG. 4 is a front view illustrating a cutting and incising mechanism.

As shown in FIG. 4, the movable cutting blade 9 is up/down movably engaged in a guide groove 19a of a guide member 19 disposed in a predetermined position. A rack 20 is attached to the movable cutting blade 9, and a pinion 21 supported on a rotation shaft of the third pulse motor M3 is geared with the rack 20. A V-shaped blade portion 8a is formed at an upper end portion of the fixed cutting blade 8, and an inverted V-shaped blade portion 9a is formed at a lower end portion of the movable cutting blade 9. If the third pulse motor M3 is rotated forward, the movable cutting blade 9 is moved downward from a standby position separated away from the fixed cutting blade 8, so that the covered wire 31 inserted between the blade portions 8a and 9a of the respective cutting blades 8 and 9 can be cut by the blade portions 8a and 9a. If the rotational speed of the third pulse motor M3 is controlled by the control circuit 18, an incision of desired depth can be formed in the cover 33 of the covered wire 31 by the blade portions 8a and 9a of the cutting blades 8 and 9.

Figure 3:
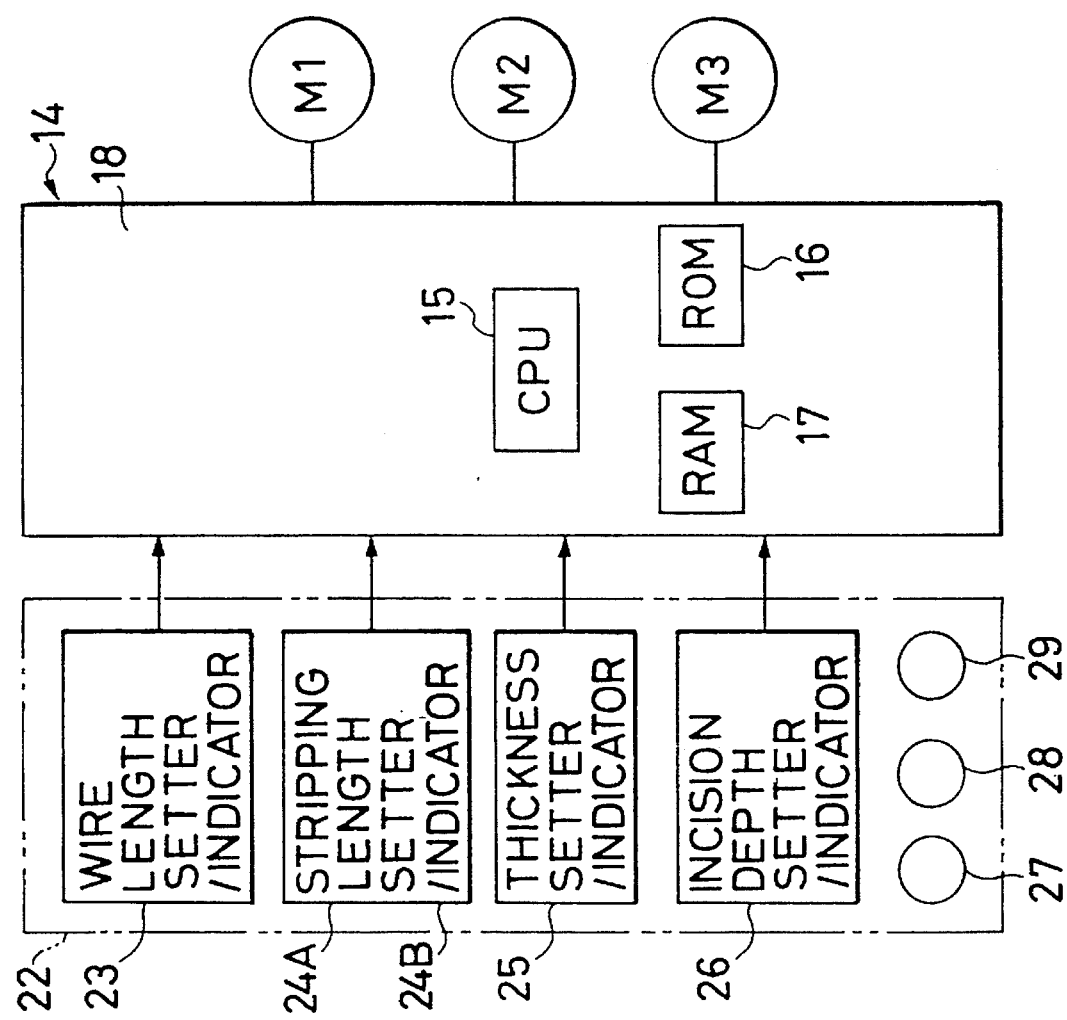
FIG. 3 is a block diagram illustrating an operation control mechanism.
Figure 6:
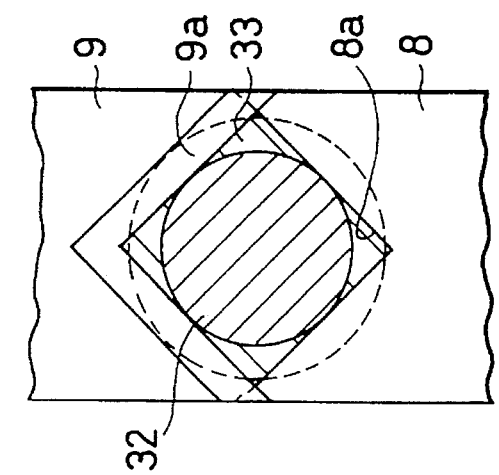
FIG. 6 is a partial sectional view illustrating the relationship between cutting blades in their incision positions and a covered wire.
Figure 5:
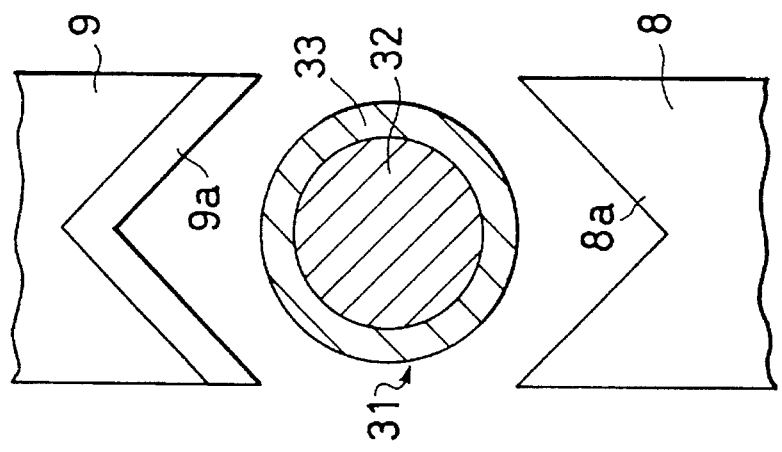
FIG. 5 is a partial sectional view illustrating the relationship between cutting blades in their standby positions and a covered wire.

As shown in FIG. 3, a manipulation box 22 is connected to the control circuit 18, and a length setter/indicator 23 of the digit switch type for setting and indicating the cutting length (whole length) L1 of the covered wire 31 is connected to the manipulation box 22. Setting indicators 24A and 24B for setting and indicating stripping lengths L3 and L4, and a setter/indicator 25 for setting and indicating thickness T (refer to FIG. 1) of the cover 33 are also connected to the manipulation box 22. A setter/indicator 26 for setting and indicating a movement distance necessary to move the cutting blade 9 down from the standby position of the cutting blades 8 and 9 shown in FIG. 5 to the position where the blade portions 8a and 9a of the cutting blades 8 and 9 just contact the outer circumference of the core 32 as shown in FIG. 6, that is, for indicating the maximum incision depth H of the cover 33, is connected to the manipulation box 22. For example, in the case where the diameter D of the core 32 of the covered wire 31 is 3 mm, the above-mentioned movement distance of the movable blade 9 is set to, for example, 10 mm by the setter/indicator 26. In addition, a start switch 27, a stop switch 28, a feed switch 29, etc. are also connected to the box 22.

Next, description will be made of the operation of cutting the covered wire 31 into a predetermined length and stripping the cover 33 of both end portions thereof by use of the thus configured automatic wire cutting and stripping apparatus.

First, prior to the operation of cutting and stripping the covered wire 31, the covered wire 31 is reeled from a reel drum (not-shown). The feed switch 29 in the manipulation box 22 is turned on, so that while the rollers 2 and 3 are rotated forward as shown in FIG. 2 (refer to the arrow), the top end portion of the covered wire 31 is inserted into the guide pipe 11 and supplied between the rotating rollers 2 and 3. Thereafter, if the covered wire 31 is moved into the guide pipe 12 and inserted between the cutting blades 8 and 9, the feed switch 29 is turned off to stop the rollers 2 and 3.

In this state, the length setter/indicator 23 for the covered wire 31 is manipulated to set and display the cutting length L1, and the stripping length setter/indicators 24A and 24B are manipulated to set and indicate the stripping lengths L3 and L4 at the cut end portions of the covered wire 31, respectively. If the start switch 27 is turned on in this state, the covered wire is cut automatically as follows.

The movable cutting blade 9 is moved downward from the standby position shown in FIG. 2 by the forward rotation of the third pulse motor M3 so as to cut and remove the top end portion of the covered wire 31. Thereafter the movable cutting blade 9 is returned to the standby position shown in FIG. 2 by the reverse rotation of the third pulse motor M3.

Figure 8:
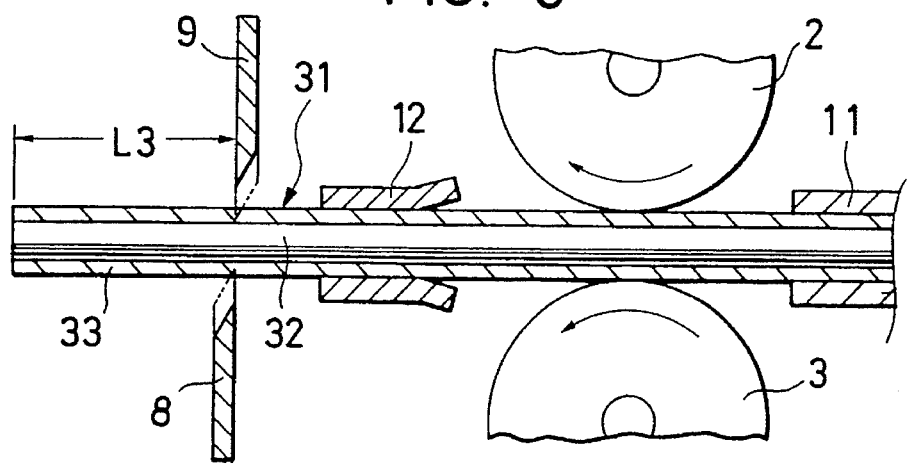
FIG. 8 is a sectional view for explaining the process of cover separation.
Figure 9:
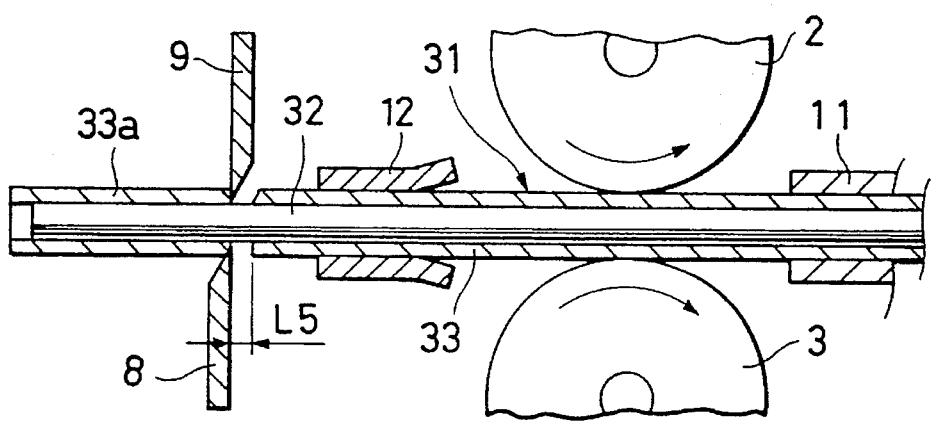
FIG. 9 is a sectional view for explaining the process of cover separation.

The rollers 2 and 3 are rotated forward a predetermined number of rotations by the first pulse motor M1 so that the covered wire 31 is moved the predetermined distance (stripping length) L3 from the cutting blades 8 and 9 as shown in FIG. 8. In this state, the third pulse motor M3 is rotated forward a predetermined number of rotations so that the movable cutting blade 9 is moved from the standby position shown by a solid line in FIG. 8 to the position where the cover 33 of the covered wire 31 is incised as shown in phantom, and the movable cutting blade 9 is stopped. In this state, the blade portions 8a and 9a of the cutting blades 8 and 9 contact the core 32 as shown in FIG. 6. If the rollers 2 and 3 are rotated reversely a predetermined number of rotations by the first pulse motor M1 as shown in FIG. 9 while both the cutting blades 8 and 9 are held in the incision position as shown in FIG. 6, the covered wire 31 is drawn back a predetermined distance L5. Therefore, an end portion 33a of the cover 33 to be stripped is relatively moved along the core 32 in the cover stripping direction.

Figure 7:
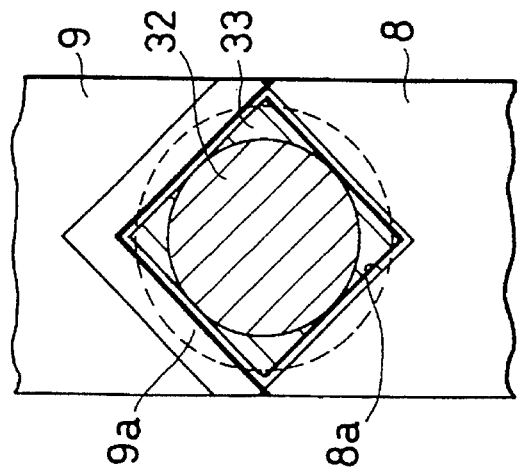
FIG. 7 is a partial sectional view illustrating the relationship between cutting blades in the position coming back slightly from their incision positions and a covered wire.
Figure 10:
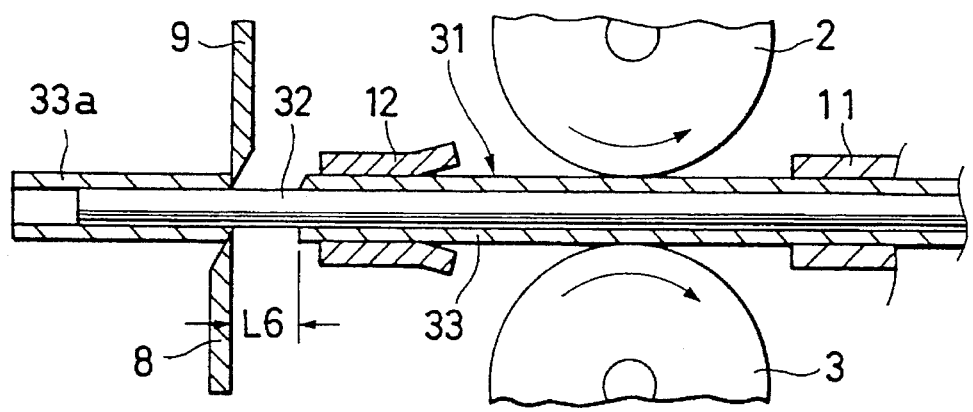
FIG. 10 is a sectional view for explaining the process of cover stripping.

Next, the third pulse motor M3 is rotated reversely a predetermined number of rotations so as to move the movable cutting blade 9 upward by a predetermined distance h1 (refer to FIG. 1) within the range where the movable cutting blade 9 is not detached from the cover 33. Accordingly, the depth of incision is reduced. The blade portions 8a and 9a of the cutting blades 8 and 9 are therefore slightly separated from the core 32 as shown in FIG. 7. Also during this operation, both the rollers 2 and 3 continue their reverse rotations, so that the cover stripping operation at the end portion 33a is performed in the state where the blade portions 8a and 9a do not contact the core 32. Further, if the operation of stripping the cover 33 is performed over a predetermined distance L6 as shown in FIG. 10, the third pulse motor M3 is rotated reversely a predetermined number of rotations again so that the movable cutting blade 9 is further moved upward a predetermined distance h2 (refer to FIG. 1) within the range where the movable cutting blade 9 is not detached from the cover 33. Accordingly, the depth of incision is again reduced. The blade portions 8a and 9a of the cutting blades 8 and 9 are therefore further separated from the core 32. Also during this operation, both the rollers 2 and 3 are continuously rotated reversely so that the stripping operation is performed in the state where the blade portions 8a and 9a do not contact the core 32.

Figure 11:
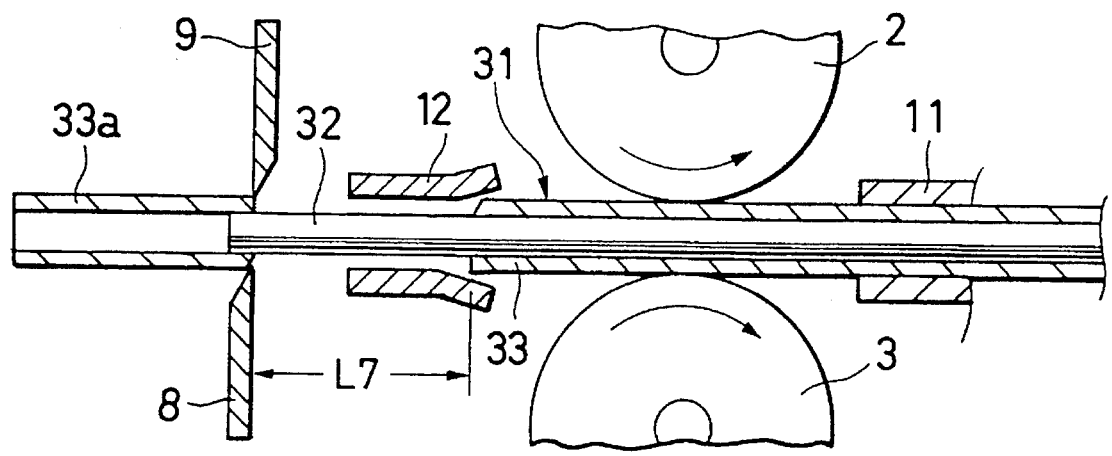
FIG. 11 is a sectional view for explaining the process of cover stripping.

If the operation of stripping the cover 33 is performed over a predetermined distance L7 as shown in FIG. 11, the third pulse motor M3 is rotated reversely a predetermined number of rotations again, and the movable cutting blade 9 is further moved upward a predetermined distance h3 (refer to FIG. 1) within the range where the movable cutting blade 9 is still not detached from the cover 33. Accordingly, the depth of incision is further reduced. The blade portions 8a and 9a of the cutting blades 8 and 9 are therefore further separated from the core 32. Also during this operation, both the rollers 2 and 3 are continuously rotated reversely, and the cover stripping operation is performed in the state where the blade portions 8a and 9a do not contact the core 32.

Figure 12:
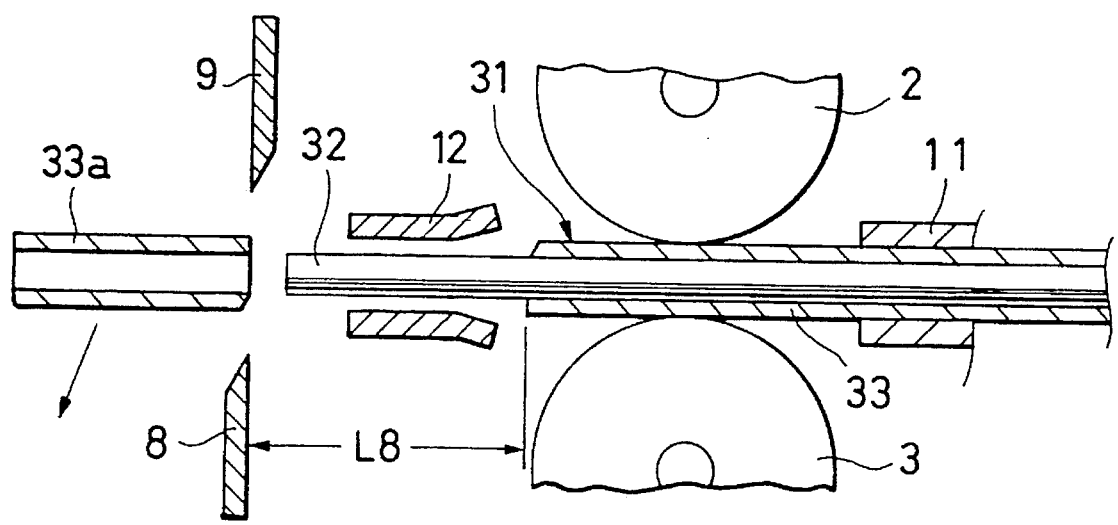
FIG. 12 is a sectional view for explaining the process of cover stripping.

If the rollers 2 and 3 are rotated forward a predetermined number of rotations and then stopped as shown in FIG. 12 so as to draw back the wire 31 a predetermined distance L8, the end portion 33a of the cover 33 is removed from the top end of the covered wire 31. Then, the cover stripping operation at the top end portion of the covered wire 31 is completed.

If the cover stripping operation at the top end portion of the covered wire 31 is completed, the movable cutting blade 9 is moved to the standby position shown by the solid line in FIG. 12, and the cutting blade 9 is stopped.

If both the rollers 2 and 3 are rotated forward a predetermined number of rotations, the top end portion of the covered wire 31 is inserted between the rollers 5 and 6, which are rotating forward, and the covered wire is fed a predetermined length (whole length L1) from the cutting blades 8 and 9. Then, the rollers 2, 3, 5 and 6 are stopped. After that, the movable cutting blade 9 is moved down to the cutting position to cut the covered wire 31 to the predetermined length L1. The cover stripping operation at the rear end portion of the wire 31 is performed in the same manner as the above-mentioned cover stripping operation at the top end portion.

The cutting and stripping is ended if the stop switch 28 is turned off. However, ordinarily, covered wires 31 are configured automatically by a number that is set by a setter/indicator (not shown) for setting and indicating the number of the covered wires 31 to be configured.

Figure 1:
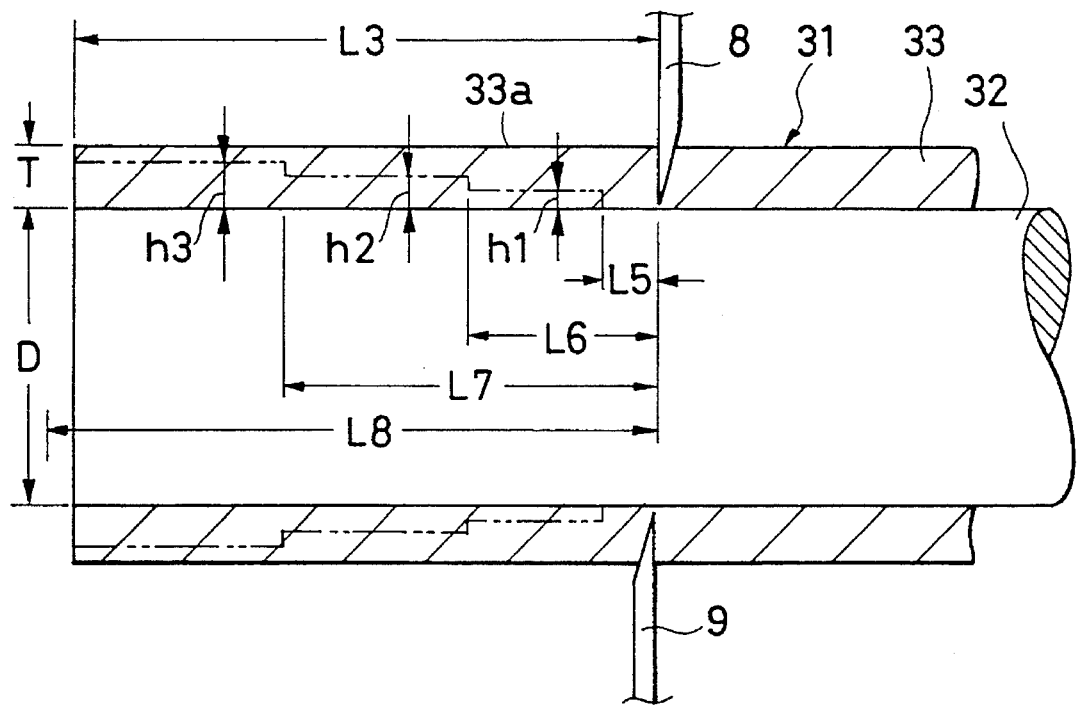
FIG. 1 is a sectional view for explaining the operation of stripping the cover of a covered wire according to the present invention.

According to the present invention, the cover 33 of the covered wire 31 is incised, and during the relative movement of the covered wire 31 and the cutting blades 8 and 9, the incision depth of the cutting blades 8 and 9 is reduced step by step from h1 to h3 as shown in FIG. 1. Accordingly, the operation of stripping the cover 33 can be properly performed. In addition, during the cover stripping operation as stripping resistance lowers, the depth of incision in the cover 33 by the cutting blades 8 and 9 is reduced such that the core 32 is prevented from being injured. At the time of starting the stripping operation, if the cutting blades 8 and 9 contact the core 32, the core 32 can be partially injured, but the degree of such injury is minimal. That is, in the case where the core 32 is a stranded wire, the cutting blades 8 and 9 are separated from the core 32 before the cutting blades 8 and 9 cut the strand. Also in the case where the core 32 is single, indeed the surface thereof is injured partially at the time of starting the cover stripping operation, but this injury is very slight in comparison with the injury made by scratching the core 32 with the cutting blades 8 and 9 during the stripping process.

Figure 13:
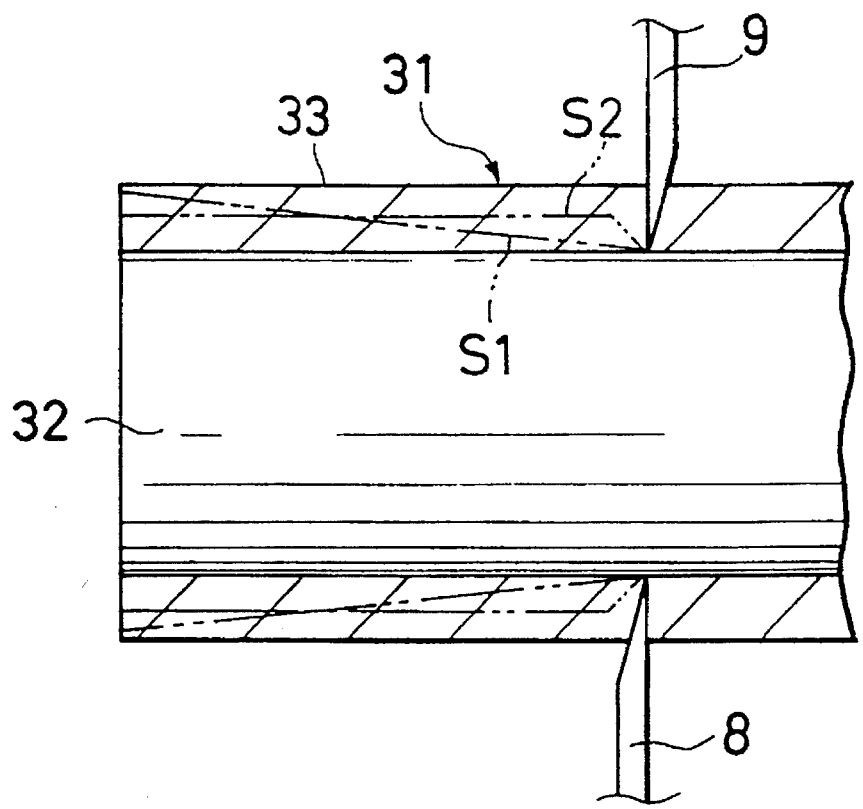
FIG. 13 is a partial sectional view illustrating another embodiment of the present invention.
Figure 14:
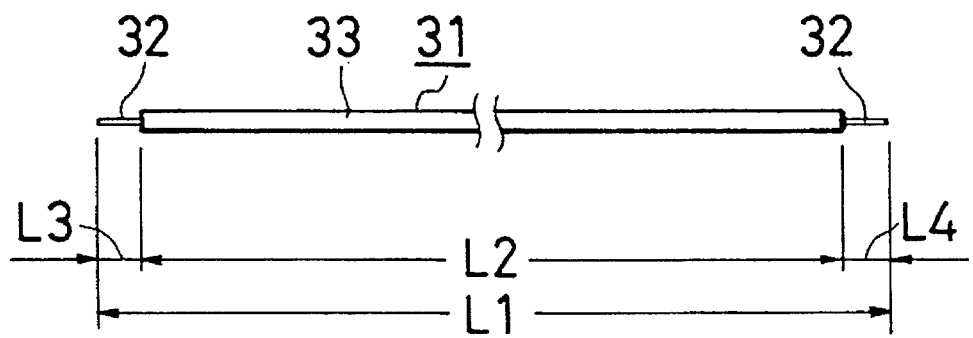
FIG. 14 is a front view of a covered wire that was cut and stripped.

The present invention is not limited to the above-mentioned embodiments, and it can be carried out by modifying the structure of respective portions without departing from the spirit and scope of the present invention. For example:

(1) The quantity of reduction of incision depth of the cutting blades 8 and 9 can be varied into a straight line, as shown by the dotted line S1 in FIG. 13, in the case where both the cutting blades 8 and 9 and the covered wire 31 are moved relatively at the same speed, or so as to increase the quantity suddenly at the beginning of the cover stripping operation as shown by dotted line S2 in FIG. 13.

(2) The cover 33 can be stripped without reducing the incision depth of the cutting blades 8 and 9 at the beginning stage of the cover stripping operation where the thickness T of the cover 33 is thinner than a predetermined value and in the case where the separation lengths L3 and L4 are longer than predetermined values, even if the thickness T is large.

(3) Although the blade portions of the fixed and movable cutting blades 8 and 9 are V-shaped, respectively, in the above embodiment, blades 8 and 9 can be arcuate or straight so that, for example, the blade portions can approach and separate away in four directions. The blades can also be formed into other shapes.

(4) The rollers 2, 3, 5 and 6, cutting blades 8 and 9, guide pipes 11 to 13, etc. can be provided each in plural pairs in order to cut and separate a plurality of covered wires 31 at the same time.

What is claimed is:

1. A cover strip-off method for a covered wire cutting and stripping apparatus in which a cover at an end portion of a covered wire is stripped and the covered wire is cut to a predetermined length, the method comprising the steps of:

incising the cover at the end portion of said covered wire by means of a plurality of cutting blades disposed opposite to each other by an incision amount;

moving said covered wire and said cutting blades relative to each other in a longitudinal direction of said covered wire during said incising, thereby stripping off the cover at the end portion of said covered wire from said core; and reducing the amount of incision in said covered wire of said cutting blades while maintaining portions of said cutting blades in contact with said cover during said moving step.

2. A method of stripping a cover off of a core of a covered wire, the method comprising the steps of:

incising said cover by inserting a cutting device into said cover by a predetermined amount, said amount being less than a thickness of said cover;

moving said covered wire relative to said cutting device in a stripping-off direction while said cutting device is inserted into said cover; and reducing the amount of insertion of said cutting device during said moving step.

3. The method as claimed in claim 2, further comprising, prior to said incising step, the steps of:

setting, in a controller, a cutting length of said covered wire;

setting, in said controller, at least one stripping length for stripping said covered wire; and inputting the thickness of said cover to said controller.

4. The method as claimed in claim 3, further comprising, prior to said incising step, the step of feeding said covered wire in accordance with said cutting length.

5. The method as claimed in claim 4, wherein said incising step comprises the step of incising said cover at a location determined in accordance with said at least one stripping length.

6. The method as claimed in claim 3, further comprising, prior to said incising step, the step of determining a maximum insertion depth of said cover in accordance with said thickness of said cover, said predetermined amount corresponding to said maximum insertion depth determined in said determining step.

7. The method as claimed in claim 2, further comprising, prior to said inserting step, the step of determining a maximum insertion depth of said cover, said predetermined amount corresponding to said maximum insertion depth determined in said determining step.

8. The method as claimed in claim 2, wherein said reducing step comprises the step of maintaining said cutting device in contact with said cover.

9. The method as claimed in claim 2, wherein said reducing step comprises the step of stepwise reducing the amount of insertion of said cutting device during said moving step.

10. The method as claimed in claim 2, wherein said reducing step comprises the step of continuously gradually reducing the amount of insertion of said cutting device along a straight line during said moving step.

11. The method as claimed in claim 2, wherein said reducing step comprises the step of initially abruptly reducing the amount of insertion of said cutting device then maintaining the reduced amount during said moving step.

* * * * *